United States Patent [19]

Hansen et al.

[11] 4,385,350
[45] May 24, 1983

[54] MULTIPROCESSOR SYSTEM HAVING DISTRIBUTED PRIORITY RESOLUTION CIRCUITRY

[75] Inventors: Stanley W. Hansen; Mark D. Whaley, both of Colorado Springs; John D. Terleski, Palmer Lake, all of Colo.

[73] Assignee: Ford Aerospace & Communications Corporation, Detroit, Mich.

[21] Appl. No.: 169,251

[22] Filed: Jul. 16, 1980

[51] Int. Cl.³ .............................................. G06F 1/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,710,324 | 1/1973 | Cohen | 364/200 |
| 3,710,351 | 1/1973 | Nakamura | 364/200 |
| 3,800,287 | 3/1974 | Albright | 364/200 |
| 3,815,099 | 6/1974 | Cohen | 364/200 |
| 3,909,790 | 9/1975 | Shapiro | 364/200 |
| 3,983,540 | 9/1976 | Keller | 364/200 |
| 3,993,981 | 11/1976 | Cassarino | 364/200 |
| 4,004,283 | 1/1977 | Bennett | 364/200 |
| 4,020,471 | 4/1977 | Woods | 364/200 |
| 4,030,075 | 6/1977 | Barlow | 364/200 |
| 4,048,623 | 9/1977 | Gruner | 364/900 |
| 4,058,711 | 11/1977 | Ondercin | 364/101 |
| 4,096,569 | 6/1978 | Barlow | 364/200 |
| 4,096,571 | 6/1978 | Vander Mey | 364/200 |
| 4,106,090 | 8/1978 | Erickson | 364/200 |
| 4,110,823 | 8/1978 | Cronshaw | 364/200 |
| 4,118,771 | 10/1978 | Pomella | 364/101 |
| 4,120,029 | 10/1978 | Steiner | 364/200 |
| 4,128,883 | 12/1978 | Duke | 364/200 |
| 4,141,067 | 2/1979 | McLagan | 364/200 |
| 4,148,011 | 4/1979 | McLagan | 340/147 LP |
| 4,151,590 | 4/1979 | Azegami | 364/115 |
| 4,161,025 | 7/1979 | Dahy | 364/200 |
| 4,209,838 | 6/1980 | Alcorn | 364/200 |
| 4,271,465 | 1/1981 | Ohtsuka et al. | 364/200 |
| 4,334,288 | 6/1982 | Booher | 364/900 |

*Primary Examiner*—Harvey E. Springborn
*Attorney, Agent, or Firm*—Edward J. Radlo; Robert D. Sanborn

[57] ABSTRACT

A fully distributed computing system comprises several processors, each having an arbitrarily long unique logical address. A bidirectional bus connects each of the processors and is used for communicating information between and among processors, and for resolving requests from a competing set of processors desiring access to the bus for subsequent communication with another processor. Resolving apparatus, comprising pan-processor control lines and a resolution member within each processor, awards bus access to that competing processor having the lowest logical address. All control lines within the resolving apparatus are bidirectional; as a result, the system "fails soft," i.e., there is no single point of failure in the system; one of the processors can fail without disrupting the operation of the remainder of the system. Each processor's resolution member comprises one or more resolve elements, which can be single-bit, dual-bit, or multi-bit resolve elements. As an example, a single-bit resolve element is a circuit for determining whether a binary test bit representing one bit position of the logical address for that processor is at least as low as the lowest bit from a set of other bits representing the same bit position of the logical address of each of the other competing processors. For resolve elements other than single-bit, binary addresses are converted into unitary representation, thus removing ambiguities from the system, enabling the instantaneous identification of all active addresses on the bus, and the unambiguous detection of the identity of a failed processor of the competing processors.

9 Claims, 8 Drawing Figures

MULTIPROCESSOR SYSTEM HAVING DISTRIBUTED PRIORITY RESOLUTION CIRCUITRY

BACKGROUND OF THE INVENTION

1. Field of the Invention

This invention is a circuit for determining when a binary bit (or pair of bits) is at least as low as the lowest of several other bits (or pairs of other bits). The invention thus has wide applicability in the field of digital computers.

2. Description of the Prior Art

A prior art search uncovered the following references, which pertain to one field of applicability of the invention, i.e., resolution of priority among several processors competing for a common bus in a multi-processing computer system.

U.S. Pat. No. 4,096,569 provides priority resolution incorporating individual inhibit lines from each device to all lower priority devices, regardless of whether such devices are requesting access. The use of single valued inhibit llines in accomplishing parallel priority resolution requires many signal wires in the bus. The bus of the present invention uses ten signal lines to accomplish what would require 127 signal lines using the technique of this patent.

In U.S. Pat. Nos. 4,030,075, 3,993,981, and 4,120,029, priority resolution is dependent upon physical position along the bus, rather than the composite logical address, which can include priority and logical location (independent of physical location).

U.S. Pat. Nos. 3,800,287, 3,710,324, and 3,815,099 utilize daisy chaining priority resolution. This is a system in which processor "A" is matched against processor "B," the winner is pitted against processor "C," the winner of that is pitted against processor "D," etc. Daisy chaining is eschewed in the present invention because it introduces multiple single points of failure, and prohibits on-line bus adaptor replacement.

U.S. Pat. Nos. 4,128,883, 4,151,590, and 3,909,790 use centralized processing rather than distributed processing as in the present invention.

U.S. Pat. No. 4,004,283 employs sequential software polling for interrupt control, whereas the present invention eschews sequential polling. Furthermore, the patent requires hardwired Peripheral Interface Adapter identification in contrast to the logical addressing of the present invention.

U.S. Pat. No. 4,096,571 uses a single priority comparator to award priority to the device with the highest clock count on a wait-time bus. If there is a tie between two or more devices as to which has been waiting the longest, the tie is resolved by priority dummy source 19, which overrides the wait-time bus. On the other hand, the present invention resolves to the lowest composite logical address, comprised of non-unique priority information and unique logical location information. The present invention uses a single bus to perform priority resolution, data transfer, and addressing, whereas the patent uses three separate buses for these three functions.

The priority resolution network of U.S. Pat. No. 3,983,540 is inflexible and requires many signal wires. The present invention uses 10 signal prioritization lines to accomplish what would require 81 signal lines using the patent. Furthermore, the patent does not offer dynamic priority setting as does the present invention, and the patent has a priority network separate from the address/data bus, unlike in the present invention where all these functions are performed on the same bus.

Secondary references are: U.S. Pat. Nos. 4,020,471; 4,141,067; 4,058,711; 4,161,025; 4,118,771; 4,110,823; 4,106,090; and 4,048,623.

SUMMARY OF THE INVENTION

The present invention is an architecture and circuit which accomplishes the resolution of competing demands to transmit data on a multi-processor intertie bus by two or more parallel processing units which simultaneously seek access to the bus. The environment of the invention is a distributed processing computer communications system in which an arbitrary number of parallel processors are connected to the multi-processor intertie bus. Each processor is capable of independent operation and each may communicate with any of the other processors in the system.

The resolution of the conflicting demands is done on the basis of the lowest composite logical address (CLA) among the competing processors. The CLA may be coded to include a non-unique priority as well as unique logical location information. If the priority information forms the most significant bits of the CLA, with the highest priorities given the lowest binary representation, then the award of priority will be given to that processor exhibiting the lowest logical location for a given level of priority that is at least as high as any other processor requesting access.

Identical resolution logic is provided on each processor. This logic may be in the form of a fungible printed circuit card, for example. Resolution logic for all processors desiring bus access is activated simultaneously.

Two bus control lines, BUSY (item 12) and AOL (item 11), are relevant to this invention. When the bus goes idle, BUSY goes high. All processors wishing to participate in bus access indicate their desire by rendering their connection to AOL low. This keeps AOL low throughout the bus, and coupled with a high BUSY, allows the bus access resolution logic to perform. The resolution is performed by a series of resolve elements (items 40, 44, 48). Corresponding resolve elements from each competing processor operate on one or more binary bit positions of the CLA to perform each of a series of elemental resolutions. In all embodiments, the higher order bit positions are resolved first, then the resolution proceeds downward to the least significant bit positions. Timing delays are built into each resolve element to insure that each elemental resolution is completed before the next can begin. For each elemental resolution, unitary state information for each processor's CLA portion is compared with the resultant unitary state information resulting from the logical ANDing of this information with similar information from all other processors. After all the elemental resolutions have been completed, that processor exhibiting the lowest CLA seizes control of the bus while all other processors relinquish said control.

The bus is wired such that a low condition (zero volts) placed onto any one of the lines of the bus by any one of the processors will hold that line low throughout the entire bus regardless of the status of the other processors' outputs onto that line. This is equivalent to a logical "AND" operation if one considers the "inputs" to the "AND gate" to be the signals outputted by the drivers of each of the processors and the "output" to be the resultant state of the bus line.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENTS

Modern computer systems make extensive use of "bus" architectures for shared data exchange. The bus represents a single communications node that is temporally reallocated among multiple system elements. For example, a bus-oriented system might be configured with different resource controllers attached to a single party line bus that allows sequenced, yet random, bi-directional data transfers using the same signal path.

MOS microprocessors may not be as fast as TTL or ECL processors, but the functional complexity of the units permits replacement of large logical networks with just a few microprocessor elements. Sometimes this results in the use of multiple processor units, with dependent tasks being assigned to different units. To interconnect a group of these units together without imposing any slowdown in processing requires an interconnection bus with unusual capabilities. An example of such a bus, which provides fast, non-interfering data exchange, is multi-processor intertie bus (MPIB) 13 of the present invention. Important capabilities of bus 13 include on-line replacement of processors 20 and adaptive (dynamic) priority queuing. The application of the "ANDed" functional resolve determines the granting of bus access to any particular parallel processor 20 from among many requests.

Figure 1:
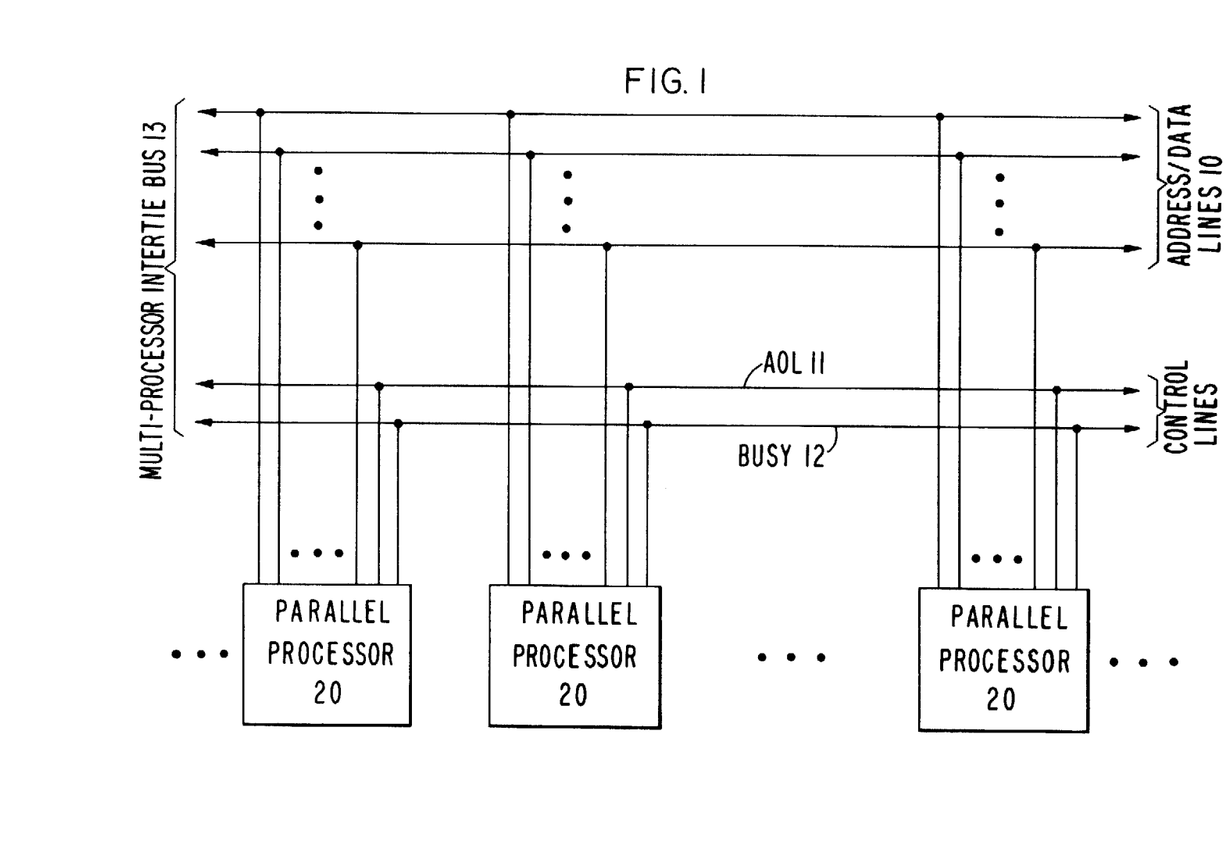
FIG. 1 is a block diagram of the multi-processor intertie bus showing an arbitrary number of parallel processors connected to the bus.

FIG. 1 illustrates a multi-processor intertie bus (MPIB) 13 which is connected to an arbitrary number of parallel processors 20. Each processor 20 is capable of independent operation and is capable of communicating with any of its sibling processors in a bidirectional fashion. In a typical configuration which has been built, the total bus length is 25 feet, there are up to 128 processors connected to the bus, and the data transfer rate on the bus is 6 megabytes per second. Data and address bytes travel along the bus on a set of parallel bidirectional data/address lines 10, with each line representing a single bit of binary or unitary encoded data, and the set of lines 10 representing a word or byte. The number of such parallel lines 10 is an arbitrary number $m+1$. FIG. 1 actually shows three individual data/address lines 10, each of which is connected to each processor 20. The relative positions of the data/address lines are kept track of from processor to processor, so that the jth data/address line within each processor is connected to the jth data/address line for all other processors, for all j, $0 \leq j \leq m$. In addition to data/address lines 10, bus 13 has at least two control lines, designated AOL 11 and BUSY 12, each of which is similarly connected to known positions within each processor 20.

This bus architecture provides many advantages, including interface commonality, modularity, signal line efficiency, and easy expandability. The number of data/address lines 10 and control lines such as 11 and 12 provided in bus 13 is variable, and highly dependent upon the particular system application.

One area in the prior art where technology is not straightforward is with regards to bus control. Various methods have been employed, such as master/slave relationships, prioritized daisy-chaining, and interrupt-driven resolution networks. All of these methods involve a "centralized" bus control function. In the present invention, on the other hand, bus control functions are decentralized and distributed across all of the system elements that are attached to the bus. The bus itself actively participates in control functions, and there is no single point of control, or failure, in the system. Other advantages of this system include the capabilities for on-line element replacement and real time task priority management.

To actively participate in the control of bus operations, the bus itself must have a logical decision making capability. The logical function incorporated into the bus is the logical "AND." This is accomplished by using the pan-processor data/address line and control line interconnections illustrated in FIG. 1 and by using bus driver elements (items 34, 35, 59, 60, 61, and 62) which are current limited. Each bus driver has two states: a current sink state, corresponding to a low condition, which acts as a short circuit, and a current source state, corresponding to a high condition, in which the bus driver places a fixed finite amount of current on its associated bus line. The amount of this current is large enough to cause bus receiving elements connected to the line to record a "high" voltage condition, but not so large as to prevent the capability of a single driver to pull the line low despite attempts by all other drivers connected to that line to lift the line high. With this type of circuitry, if at least one processor's driver element is pulling the signal on any particular line low (i.e., zero volts), the resultant signal on that line throughout the bus as seen by all processors will be low. Since the driver elements are current limited, there is no combination that can lift a line high (approximately 5 volts for TTL components) if any one or more drivers is pulling it low. In other words, a short circuit in one of the drivers of a line will short the entire line.

Feedback is provided on every bus line from the bus 13 back to each processor 20 so that each connected parallel processor 20 is able to compare the resultant signal on the bus line with the processor's own status on that particular line. This pattern comparison process represents a new application of technology that allows the implementation of a unique set of bus control capabilities so that the processor presenting the lowest "composite logical address" (CLA) is given control of the bus. The comparison function is described herein in its preferred hardware embodiment, but it could be implemented in firmware or software, depending on the speed at which the bus must operate for the particular application. Hardware design approaches always operate much faster, but the programmable approaches can provide greater flexibility.

Figure 6:
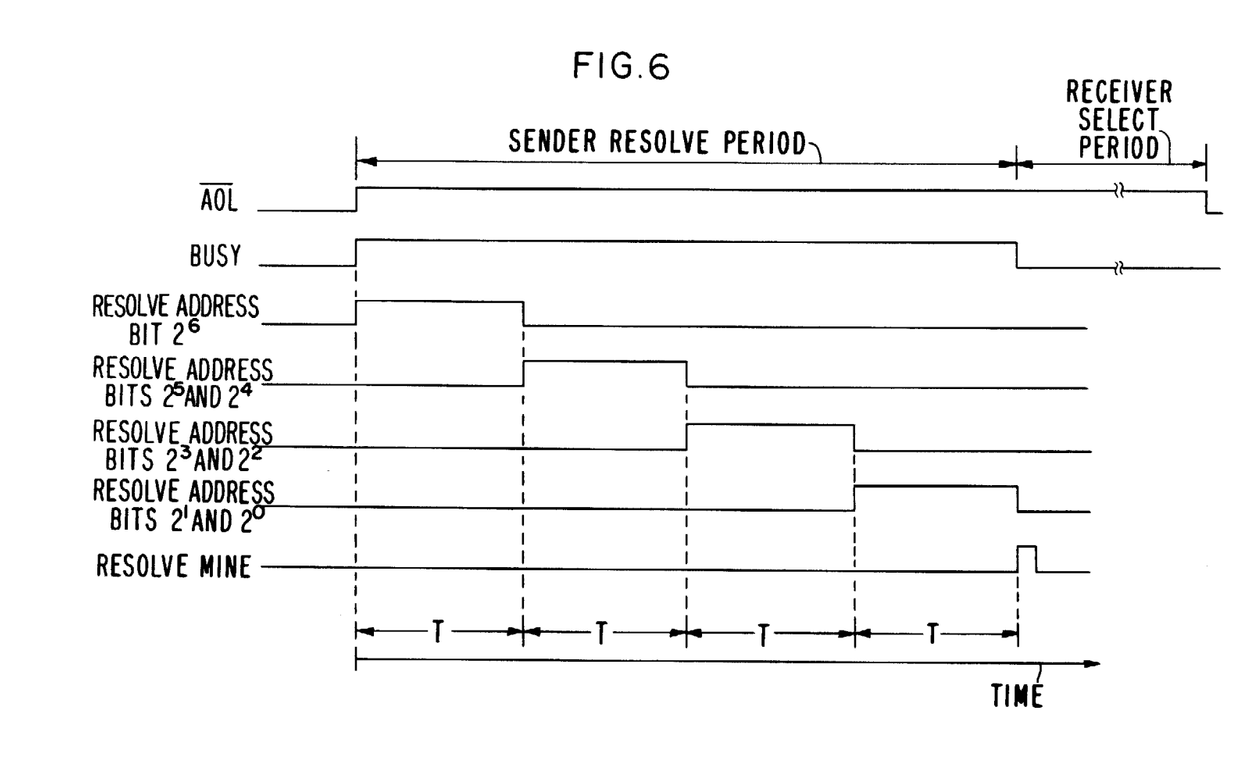
FIG. 6 is a timing diagram showing various steps along the way in a typical resolution process wherein each processor has one resolve element that operates on one binary bit position and three resolve elements that operate on two binary bit positions.

Different states (periods) of bus operations are outlined as follows (see FIG. 6):

Sender Resolve Period—The sender resolve period exists when BUSY line 12 is high (logical "1") and Address-On-Line (AOL) line 11 is low (logical "0"). (In other words, AOL is high). During this state, all processors 20 requesting bus access place their individual composite logical addresses (CLA's) on data lines 10 and drive their AOL line low. The resolution logic of each competing processor will be activated, and the processor with the lowest CLA will be selected.

The CLA can include non-unique priority bits as well as unique logical location information. When part of the CLA is dedicated to priority information, and coding is such that the higher the priority, the lower the binary representation of the priority, the selection among competing sender processors can be accomplished through a logical addressing scheme which requires that the capturing unit must have a priority that is no lower (i.e., higher in terms of binary representation) than that for any other competing processor and have the lowest logical location. The resolution technique does not require sequential addressing nor that a physical processor having that logical location exist. Furthermore, a physical processor can have multiple CLA's, priorities, and/or logical locations over time. Therefore, the inherent flexibility of the MPIB bus structure is exemplified in its ability to logically configure the system in any manner desired, while not requiring any change to hardware.

Receiver Select Period—The receiver select state is entered after a sender processor has captured the bus, and driven the BUSY line low. Therefore, the receiver select state exists whenever both the BUSY and the AOL signals are low. During this state, the sending processor places at least the logical location portion of the CLA of the intended receiving processor on bus data/address lines 10. All processors 20 compare the address on the bus against their own address, and the receiving processor with the correct address acknowledges its ability to accept an immediate data transfer. By the type of acknowledgement returned, the receiver processor can indicate that only a particular type of message may be sent, or it can request requeuing of the transfer request. Upon recognition of a nominal receiver response, the sending processor drives its AOL line high and the data transfer state is entered. The data transfer state will not be discussed in detail herein, except to say that only one group of data bytes is transmitted along bus 13 at any one time.

The isolation of failed processors can be achieved by providing a second, independent, load sharing bus 14 (not illustrated) that operates in parallel to the first bus 13. Then any failure that impedes operations on bus 13 can be circumvented through exclusive use of bus 14. Connections between each processor 20 and bus 14 duplicate connections between each processor 20 and bus 13. Buses 13 and 14 can be activated simultaneously in data transfer states, as long as the buses are not sending or receiving data from the same processor. With respect to the sender resolve period, a contending processor will first attempt to seize that bus where it was most recently active (in terms of either sending or receiving data). If that bus is busy, the processor will attempt to seize the other bus. A single processor can contend for only one bus at any given time.

Because none of the bus signals is daisy-chained between processors, on-line replacement of any failed processor can be performed without disturbing the system. The only requirement is the capability to disable the power to the processor being replaced, during replacement, through onboard power control, so that connector mating will not generate erroneous signals on the bus signal lines. If the replacement processors are configured to be programmably personalized to an assigned function, then through downline loading techniques (wherein processor A changes the operating system of processor B), the system architecture can be further defined in a logical fashion rather than being restricted to a permanently defined hardware architecture. This approach also makes duplication of the system elements a much easier task, since most of the processor logic can then be constructed as identical hardware.

The system thus consists of programmably personalized functional nodes distributed along a decision-making party-line bus. The system always fails soft, and replacement maintenance can be performed while the system remains on-line.

The CLA resolve logic illustrated in the drawings herein is shown implemented in TTL hardware, but it must be remembered that the implementation can take other forms, including PROM's, FPLA's, etc.

Figure 2:
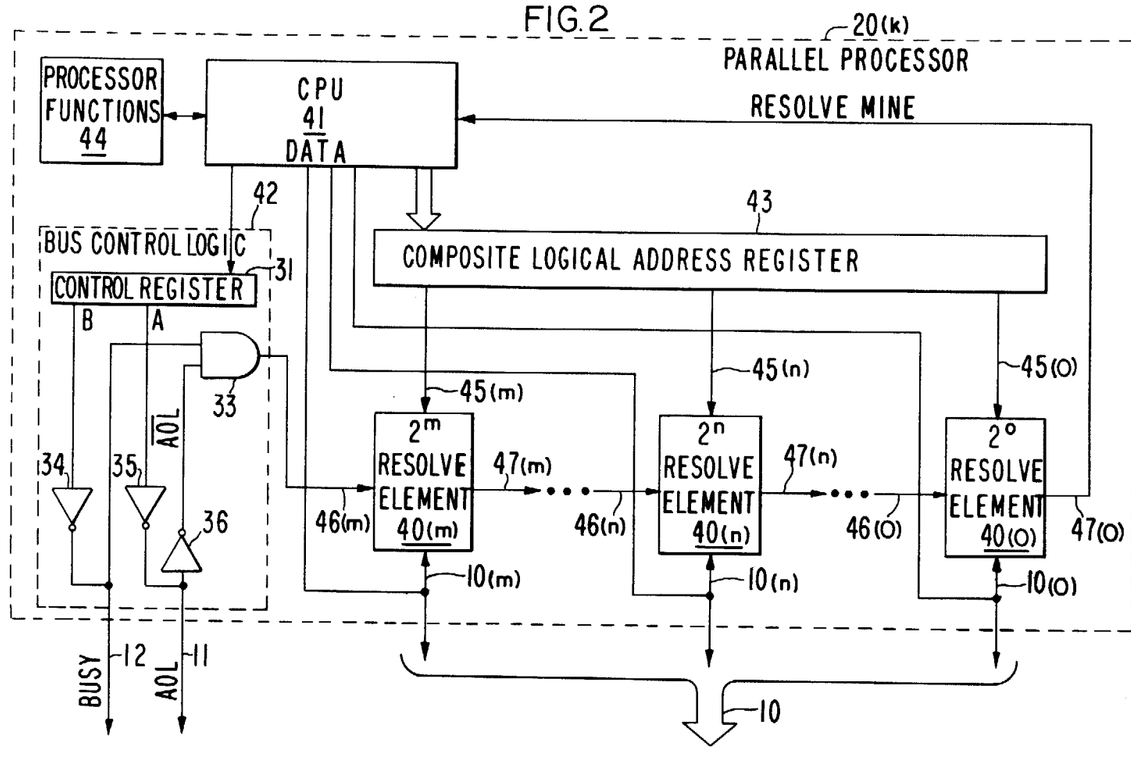
FIG. 2 is a partly block, partly schematic diagram of the resolution logic which is contained within each one of the parallel processors.

FIG. 2 shows resolution logic which exists within each parallel processor 20 that is connected to bus 13. CPU 41 is a central processing unit that performs many of the housekeeping and computational functions for the processor. Connected to CPU 41 can be one or more processor functions 44, such as memory, input/output, peripheral devices, etc. which give definition and uniqueness to the processor. CPU 41 communicates electronically with bus control logic 42, telling bus control logic 42 when it wishes to seize control of the bus and when it has emerged victorious in a CLA resolution contest. CPU 41 also loads the CLA into composite logical address register 43 for subsequent presentation to bus 13.

Register 43 is connected to each of the data lines 10(0) through 10(m) of bus 13 via a set of resolve elements 40. As illustrated in FIG. 2, there is one resolve element for each binary bit position within register 43. Each line 10 represents one such bit position. However, as will be explained below, a resolve element can handle more than one binary bit position simultaneously.

CPU 41 is further directly connected to each data/address line 10 via a set of lines shown connected from the data terminals of CPU 41 directly to data/address lines 10, for purposes of transmitting data to bus 13 and receiving data from bus 13. This part of the circuitry is not directly part of the present invention and will not be discussed further.

Each resolve element 40 has an input line 45, known as an address line, connected to CLA register 43, an enable line 46, a resolve carry line 47, and a bus line 10. The resolve carry line connected to the rightmost, i.e., lowest ordered, resolve element 40 is known as the "resolve mine" line and is connected to CPU 41. The enable line of the leftmost, i.e., highest ordered, resolve element 40 is connected to bus control logic 42. Illustrated in FIG. 2 are M+1 resolve elements corresponding to M+1 binary bit positions and m+1 data/address lines. Resolve elements 0 through n can, e.g., correspond to the particular processor's unique logical location, whereas resolve elements n+1 through m can correspond to that processor's priority information, which can be the same for more than one processor.

Within bus control logic 42 is control register 31 which receives and stores information from CPU 41 and outputs this information on its B and/or A outputs. Output B will go high when this particular processor 20(k) has seized control of the bus. This high B indicates to the rest of the system that the bus is not available for resolution of sender disputes, in the following fashion:

A high B is inverted by inverter 34, which is a current limited device, e.g., a unity gain inverting op amp, which thereby places a "0" on BUSY line 12 of bus 13 and a "0" at the uppermost input of AND gate 33. Since each processor 20 in the system has identical resolution logic, and since all BUSY line drivers 34 are current limited devices, BUSY line 12 will be "0" throughout the system and all AND gates 33 will be disabled, thereby disabling the resolution logic of each processor. This enables the particular parallel processor 20(k) to use the bus as long as the system permits, upon which time the B output of control register 31 is changed to a "0", whereupon processor 20(k) places a "1" on BUSY line 12. If all the processors in the system have thus placed a "1" on BUSY line 12, BUSY will be a "1" throughout the system and those processors wishing to gain access to the bus will then be able to participate in the resolution process by means of the status of the lowermost input to their AND gate 33 as follows:

A processor wishing to gain access to the bus will output a high condition at the A output of its control register 31. This high is changed to a low condition on AOL line 11, thereby forcing AOL line 11 to be low if only one processor wishes to gain access to the bus, by the action of AOL driver 35, which is a current limited device, e.g., a unity gain op amp. This low condition is changed back to a high condition placed at the lowermost input of AND gate 33 by inverter 36. $\overline{AOL}$ is thus high.

As illustrated in FIG. 6, when $\overline{AOL}$ and BUSY are both high, the sender resolve period is entered. This is signified in FIG. 2 by both the inputs of AND gate 33 being enabled, which outputs a high condition at the output of AND gate 33. This high condition is then transmitted along the enable input of the highest order resolve element 40(m). The sender resolve function then consists of finding that processor that is requesting attention which has the lowest composite logical address (CLA). Since in the example illustrated, positions "0" through "n" represent logical location and positions n+1 through m represent priority, it is desirable to have coded the priority bits such that the lower the priority bits in binary representation, the higher is the priority represented by said bits. Thus, assuming there are two binary bits reserved for priority information (bits m and m−1), a 0,0 represents the highest priority whereas a 1,1 represents the lowest priority.

The logic resolves in favor of the lowest CLA by testing from the most significant bit down to the least significant bit, i.e., in a left to right direction in FIG. 2. This process is performed in a temporally piece-wise fashion by means of incorporating delay elements in each of the resolve elements 40. This resolution process is performed simultaneously within each of the processors 20 that desires to gain access to bus 13 as follows:

The first elemental resolution is performed by each competing processor's resolve element 40(m). The state of the local mth position of the CLA of processor 20(k) as appearing on line 45(m) is compared with the resultant state of the mth position for all other processors requesting access to the bus as reflected back on line 10(m). Since a "0" place on line 10(m) by any other such competing processor will force line 10(m) to be low, when this line is low, processor 20(k) will stay alive in the competition only if its line 45(m) is low as well. If, on the other hand, line 10(m) is high, that means that all the competing processors are high in their mth position, and processor 20(k) will stay alive even if its line 45(m) is also high.

If processor 20(k) remains alive in the competition, its line 47(m) will be high, thereby enabling its next lower order resolve element 40(m-1). Otherwise, 47(m) will be low, thereby disabling the remaining resolve elements within processor 20(k) and this processor will drop out of the competition.

As the decision-making process moves from left to right, i.e., from highest order bit to lowest order bit, gradually processors are eliminated from the competition and ultimately only one will emerge victorious. That particular processor will output a "1" on its line 47(0), thereby signaling to its CPU 41 that it has won, whereupon its CPU 41 signals to its control register 31 to output a "1" at its B output, thereby tying up the bus. The next step will be to find that processor with which the victorious processor wishes to communicate. That part of the circuit is not the subject of the present patent application.

Figure 3:
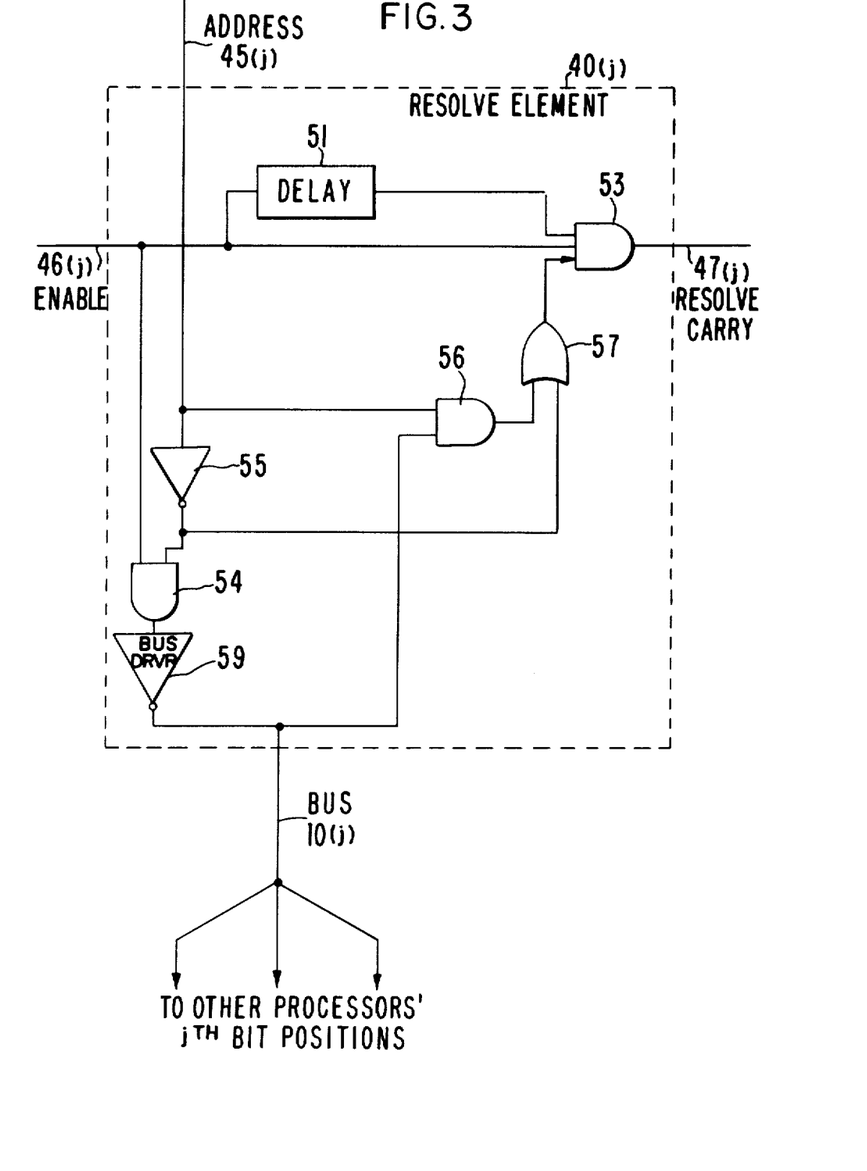
FIG. 3 is a schematic diagram of a resolve element which is designed to resolve just one binary bit position of the CLA.

The operation of a resolve element 40 will now be examined more closely by looking at FIG. 3, which illustrates a resolve element 40 capable of operating on a single binary bit. This particular resolve element has been designated 40(j), where $0 \leq j \leq m$, to indicate that all m+1 resolve elements 40 within each processor 20(k) of FIG. 2 are identical.

The enable input 46(j) is connected as one input to AND gate 54. The address input 45(j) is connected via inverter 55 to a second input of AND gate 54, and to a first input of AND gate 56. The output of inverter 55 is also connected to a first input of OR gate 57. The output of AND gate 54 is connected to the input of bus driver 59, which is a current limited device, e.g., a unity gain inverting op amp. The output of bus driver 59 is connected to bus 13 via data/address line 10(j) and is also connected to a second input of AND gate 56. The output of AND gate 56 is connected to a second input of OR gate 57. The enable line 46(j) is also connected to a first input of AND gate 53, and via delay element 51 to a second input of AND gate 53. The amount of delay T built into delay element 51, which can be a delay line, is the longest time that it could take a signal from the instant processor 20(k) to travel along bus 13 to the remotest other processor in the system. Thus, T is set equal to the propagation time along the longest path of the bus. Since the speed of electrons on the bus is approximately one half foot per nanosecond, the delay T in nanoseconds then becomes approximately twice the maximum length of the line in feet. The output of OR gate 57 is connected to a third input of AND gate 53. The output of AND gate 53 becomes the resolve carry line 47(j).

A few simple examples will illustrate the operation of resolve element 40(j). If enable line 46 is low (logical "0"), AND gate 53 will be disabled; thus processor 20(k) is not participating in the competition. The other examples below assume that enable line 46 is high.

Assume that the signal on line 45 is a "0"; then we except that this processor will always continue in the competition because a "0" will be at least as low as the corresponding bit for any of the other competing processors. In this case, the output of inverter 55 is always high, which will thus always enable OR gate 57. Thus, AND gate 53 is always enabled after delay element 51 has introduced the proper delay T into this jth elemental resolution. This is the desired result.

Suppose, however, that line 45(j) is high. In this eventuality, resolve element 40(j) will keep this processor 20(k) in the competition only if all the other competing processors are likewise high in their jth position. When 45 is high, AND gate 54 is always disabled, i.e., its output is low. Furthermore, one of the inputs to OR gate 57 is always low, one of the inputs to AND gate 56 is high, and driver 59 always tries to place a "1" on bus line 10(j). If all other competing processors are likewise high in their jth position, the second input to AND gate 56 will also be high, thereby enabling AND gate 56, thereby enabling OR gate 57, thereby enabling AND gate 53 after time T has passed. This is the desired result. If, on the other hand, at least one of the competing processors is low in its jth position, a zero will appear at the lower input of AND gate 56, thereby disabling AND gate 56. Thus, OR gate 57 will not enable and AND gate 53 will not enable. Again, this is the desired result.

Remaining resolve elements for remaining bit positions operate identically until only one processor remains in the competition. This is because there is at least one portion of the composite logical address which is unique to each processor, and therefore there will be one and only one processor with the lowest CLA.

Figure 4A:
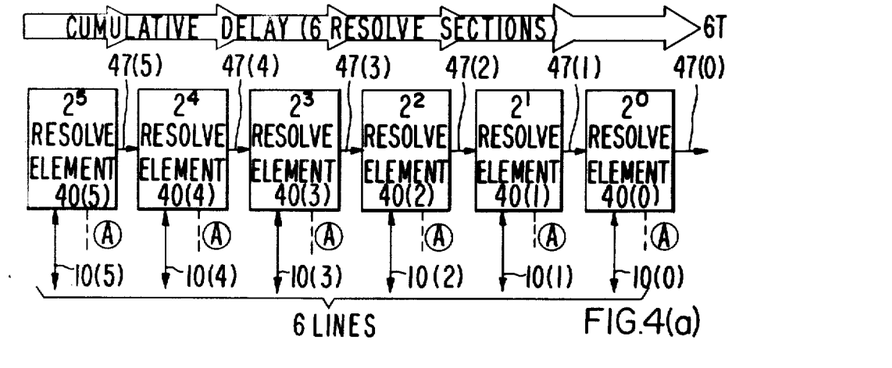
FIGS. 4a–4c constitute a logic diagram showing the tradeoffs between processing time and number of wires for various instances in which resolve elements are made to resolve more than one CLA binary bit position simultaneously.

We now turn to FIG. 4 to examine how we may speed up the processing of the system while accepting a known tradeoff in the form of an additional number of wires. The resolve elements 40(j) we have been describing are represented in FIG. 4a, which illustrates the case where one resolve element works on one binary bit position. In essence, each resolve element utilizes unitary logic. Since a resolve element 40 operates on a single binary bit, only one output bus address/data line 10 is needed for each resolve element, because the second unitary state is implied. In other words, each resolve element 40 nominally requires two wires to convey the two unitary states corresponding to its binary bit to the bus, one wire representing a "0" and the other wire representing a "1." However, one of these wires is redundant because if the state is a "0" it is already known that it cannot be a "1," and vice versa. On FIG. 4, redundant wires are indicated by broken lines labeled "A." Thus, each resolve element 40(j) requires but one output line, denominated as 10(j). The example illustrated in FIG. 4a shows six binary bits that need to be resolved. Thus, there are six resolve elements 40 and six data/address lines 10.

Figure 4B:
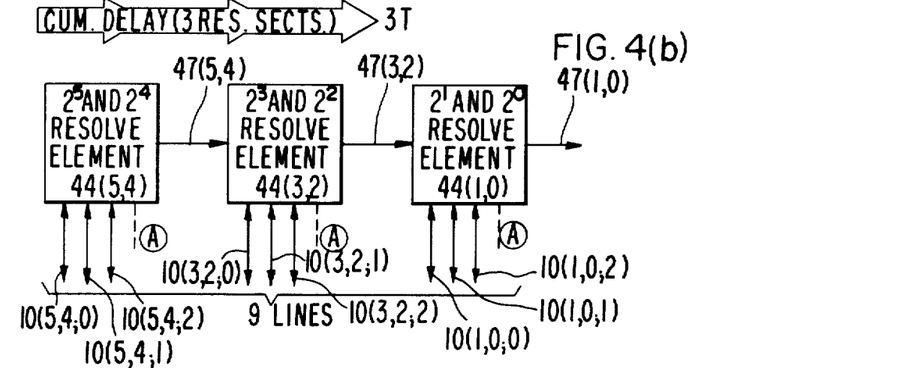

FIG. 4b illustrates the case where each resolve element 44 is capable of resolving information from two binary bits simultaneously. The unitary conversion of binary information contained in two binary bits requires four unitary state positions. In binary notation, these four states are 0,0; 0,1; 1,0; and 1,1. Thus, in unitary logic, four wires are nominally required. However, one of these four is redundant because it is implied that the fourth state exists if the other three states do not exist. Thus, each resolve element 44 in FIG. 4b has three data/address lines 10 to communicate with bus 13. The notation convention used on FIG. 4b is that numbers within parentheses and preceding semicolons signify the binary bit positions resolved by that resolve element. Numbers within parentheses and following semicolons represent ordinal position of identical items.

For the example which is true throughout FIG. 4, i.e., that six binary bits must be resolved, the resolve elements 44 of FIG. 4b can do the job with just three resolve elements; however, the number of output data/address lines 10 goes up from six to nine when compared with FIG. 4a. Since processing time is very closely linearly proportional to the number of resolve elements (because each resolve element has one delay element with delay T), the total delay introduced by the FIG. 4b embodiment is 3T versus the 6T of FIG. 4a, as illustrated.

Figure 4C:
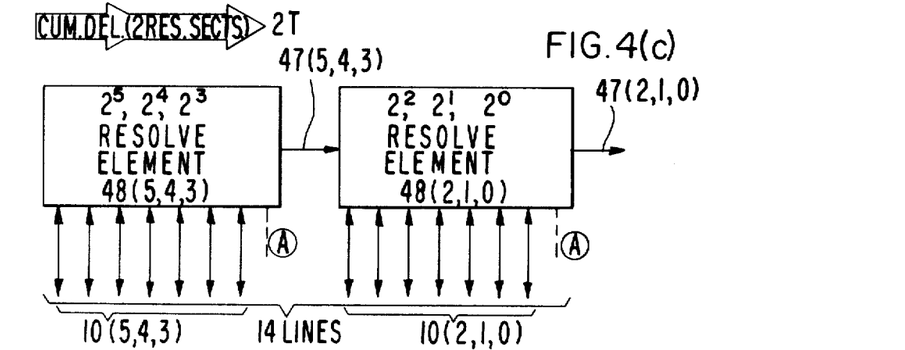

FIG. 4c shows how the delay can be cut down to 2T by using resolve elements 48 that operate to resolve three binary bit positions simultaneously. Since there are eight possible unitary states that can be represented by three binary bit positions, nominally there are eight data/address lines 10; however, one of these is implied from the absence of all of the other seven states. Therefore, just seven data/address lines 10 are needed for each resolve element 48. Thus, the embodiment of FIG. 4c gets the job done in time 2T, but requires fourteen bus lines.

Figure 5:
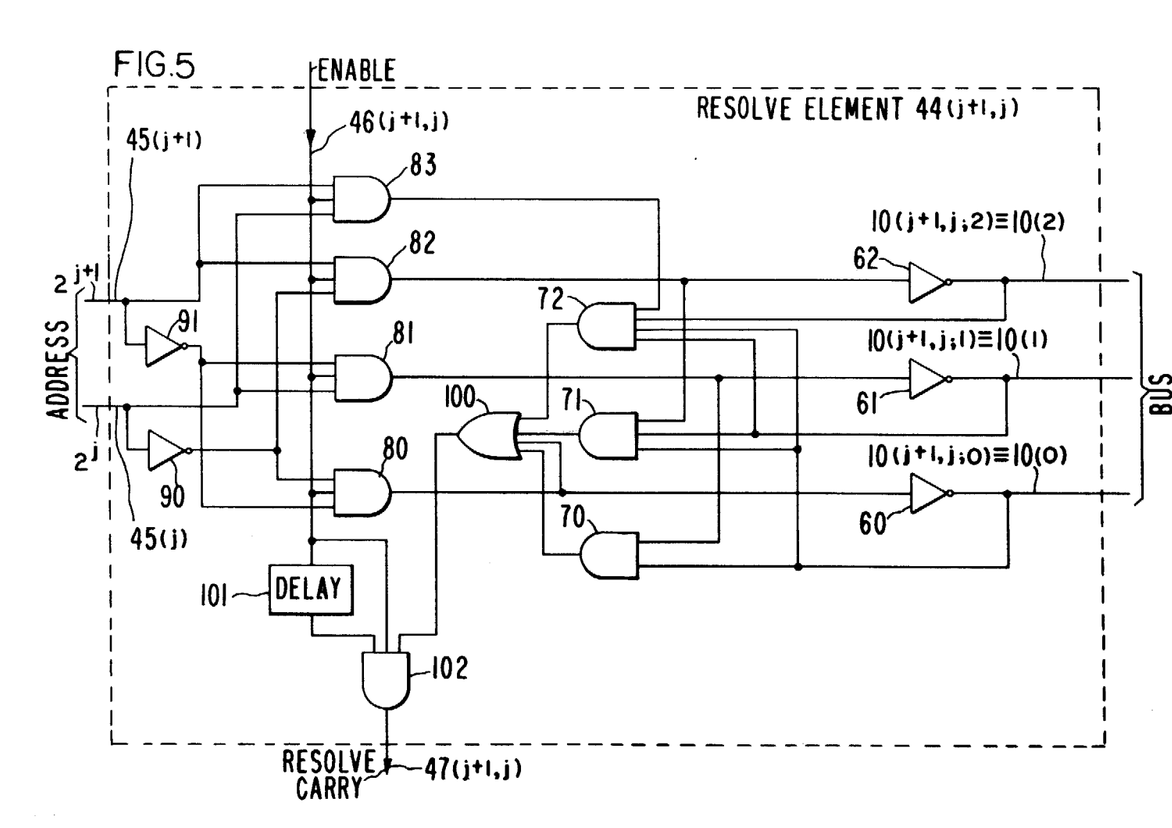
FIG. 5 is a schematic diagram of a resolve element which resolves conflicting processors' CLA's two binary bit positions at a time.

Resolve elements of different bit handling capacity can be combined within the same processor. This is graphically illustrated in FIG. 6, wherein the first resolve element operates on a single binary bit position and is thus type 40 illustrated in FIG. 3. The remaining three resolve elements are type 44 as illustrated in FIG. 5, and each of them works to resolve two binary CLA positions simultaneously. Notice that in each case the time taken by each resolve element is a constant T. The lowest line in FIG. 6 illustrates the status of the resolve mine line 47(1, 0) for that processor which wins the resolution. This line need be activated for only a very short period of time, just that time sufficient to inform its CPU 41 that the resolution has been awarded in its favor, whereupon CPU 41 signals bus control logic control register 31, which outputs a logical "1" on its B terminal, which in turn disables its AND gate 33, which disables all its resolve elements, forcing 47(1, 0) to become a logical "0." The disabling of AND gate 33 also removes the entire CLA from the bus because all AND gates of the type 54, 80, 81, and 82 are disabled, thus causing all bus drivers of the type 59, 60, 61, and 62 to go high.

The resolve elements 44 of FIG. 4b represent a good compromise between processing time and number of bus lines for many applications; therefore, resolve element 44 is analyzed more closely in FIG. 5. The illustrated resolve element 44 can operate on any two adjacent binary bits, which have been designated j+1 and j. Resolve element 44 has two input address lines representing the two binary bits which are resolved by this particular element. There are three data/address lines, which can be abbreviated 10(0), 10(1), and 10(2) for convenience.

Enable line 46 is connected to inputs of each of AND gates 83, 82, 81, 80 and 102, and to the input of delay element 101, which introduces a fixed time delay T before it relays its signal from its input to its output and thence to an input of AND gate 102. The purpose of a connection from enable line 46 directly to an input of AND gate 102 is to be able to quickly clear all the address presentations to the bus at the beginning of the receiver select period by disabling AND gates 80, 81, and 82 for all the resolve elements without having to undergo any delays that would otherwise be introduced by delay elements 101. The output of AND gate 102 is resolve carry line 47.

There are two address input lines, corresponding to the (j+1)st and the jth binary bit of the composite logical address. These lines are designated 45(j+1) and 45(j), respectively. 45(j+1) is connected to inputs of each of AND gates 83 and 82 and to the input of inverter 91, whereas 45(j) is connected to inputs of each of AND gates 83 and 81, and to the input of inverter 90. The output of inverter 91 is connected to input terminals of each of AND gates 81 and 80, whereas the output of inverter 90 is connected to input terminals of each of AND gates 82 and 80. The purpose of inverters 91 and 90 and of AND gates 83, 82, 81 and 80 is the translation of the input binary address into a unitary representation. In this fashion, each of the four possible combinations of the input address is represented by a unique pattern on the outputs of said four AND gates, such that three of said AND gates' outputs will always be zeros and the fourth will always be a "1." Assuming that enable line 46 is high, if the input (i.e., the signal on lines 45(j+1) and 45(j), respectively), is 0,0, the outputs of AND gates 83, 82, and 81 will each be "0," whereas the output to AND gate 80 will be a "1." If the input signal is 0,1, the outputs on AND gates 83, 82, and 80 will each be "0," whereas the output to AND gate 81 will be a "1." If the input address is 1,0, the outputs to AND gates 83, 81 and 80 will each be "0," whereas the output to AND gate 82 will be a "1." Finally, if the input address is 1,1, the output on AND gates 82, 81, and 80 will each be "0," whereas the output on AND gate 83 will be a "1."

The output of AND gate 83 is connected to an input of AND gate 72. The output of AND gate 82 is connected to the input of inverter 62, and to an input of AND gate 71. The output of AND gate 81 is connected to the input of inverter 61 and to an input of AND gate 70. The output of AND gate 80 is connected to an input of OR gate 100, and to the input of inverter 60. Inverters 60, 61, and 62 are bus drivers that are current limited devices, e.g., unity gain inverting op amps, whose outputs become lines 10(j+1,j;0), 10(j+1,j;1), and 10(j+1,j;2), respectively, which, for purposes of simplification, can be represented as 10(0), 10(1), and 10(2), respectively.

The output of inverter 60 is further connected to inputs of each of AND gates 70, 71, and 72. The output of inverter 61 is further connected to inputs of each of AND gates 71 and 72. The output of inverter 62 is further connected to an input of AND gate 72.

The outputs of AND gates 70, 71, and 72 are each connected to inputs of OR gate 100. The output of OR gate 100 is connected to an input of AND gate 102.

Now we are ready to illustrate the operation of resolve element 44 by means of a few simple examples. First, let us assume that enable line 46 is a logical zero. This will disable AND gates 83, 82, 81, 80, and 102. This will cause drivers 60, 61, and 62 to attempt to put logical ones onto the bus, so as to not affect any other competing processors. This is a desired result inasmuch as a low on enable line 46 means that this particular processor is not active in the competition at this point.

For the remaining examples, we assume that enable line 46 is high. First, assume that the address at lines 45 is 0,0. Since no other processor can have a lower address portion, we know that the desired result is for line 47 to be high. The high output of AND gate 80 is enough to always enable OR gate 100, despite the fact that the other inputs to OR gate 100 are all low because of the combined action of inverter 60 and AND gates 70, 71, and 72. Thus, AND gate 102 is enabled after the delay T introduced by delay element 101 has occurred, yielding the desired result.

Now let us assume that the input address on lines 45 is 0,1. This will cause a zero to be put onto line 10(1) and either zeroes or ones onto lines 10(0) and 10(2), depending on the status of the other processors that are active in the competition. The desired result is that this particular processor will stay alive if it has at least as low a CLA portion as the others in the competition. In other words, it should stay alive if the signal coming back on line 10(0) is high, whereas it should be eliminated if the signal on line 10(0) is a zero. If the signal on line 10(0) is a "1," AND gate 70 will be enabled despite the fact that AND gates 71 and 72 are disabled. Thus, OR gate 100 is enabled, which enables AND gate 102, which is the desired result. If, on the other hand, the signal on line 10(0) is a zero, thus indicating the presence of a competitor who has a lower CLA portion than the instant processor, i.e., a processor having a binary address in its (j+1)st and jth positions of 0,0, AND gates 70, 71, and 72 will all be disabled. Thus, the low output of AND gate 80 ensures that OR gate 100 is disabled, thus disabling AND gate 102, which is again the desired result.

For our final example, let us consider the situation where the implied state is enabled, i.e., the input on lines 45 is 1,1, and thus the output of AND gate 83 is high. Inverters 60, 61, and 62 all attempt to put logical ones onto the bus. The only way they can keep logical ones on the bus lines 10 is for all the other contending processors to be equally high, which will serve to enable AND gate 72. Although AND gates 70 and 71 are disabled by AND gates 81 and 82, respectively, since AND gate 72 is enabled, OR gate 100 will also be enabled, thus enabling AND gate 102, which is the desired result. If, on the other hand, any one of the data/address lines 10 is a zero, indicating some other contending processor not having a 1,1 in its (j+1)st and jth binary positions, AND gate 72 will also be disabled inasmuch as all three of the data/address lines 10 are inputted to AND gate 72. This will cause OR gate 100 to be disabled, thus disabling AND gate 102, which is again the desired result.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A fully distributed computing system comprising:
   several processors, each having an arbitrarily long unique logical address;
   a bidirectional bus connected to each of said processors for communicating information between and among processors;

means for resolving requests from a competing set of said processors desiring access to the bus for subsequent communication with another processor, wherein said resolving means awards bus access to that competing processor having the lowest logical address;

said resolving means comprising control lines connected to all of the processors for defining an interface between the information communicating process and the awarding process, wherein all the control lines are bidirectional;

said resolving means further comprising a resolution member within each processor;

wherein each processor's resolution member comprises at least one single-bit resolve element, said resolve element being a circuit for determining whether a binary test bit representing one bit position of the logical address for that processor is at least as low as the lowest bit from a set of other bits representing the same bit position of the logical address of each of the other competing processors, said circuit comprising:

an address wire for communicating the value of said test bit;

a status wire conveying the status of said other bits, wherein the voltage on said wire is high when all of said other bits are binary ones and the voltage on said wire is low when at least one of said other bits is a binary zero; and connected to said address wire and to said status wire, means for comparing the value on the address wire with the status of the status wire.

2. The system of claim 1 wherein each of said circuits further comprises:

an enable wire which has a high voltage when said determining circuit is activated, said enable wire being connected to a first input of a first AND gate, to a first input of a second AND gate, and to an input of a delay element;

wherein an output of said delay element is connected to a second input of said first AND gate;

said address register is connected to an input of a first inverter and to a first input of a third AND gate;

an output of said first inverter is connected to a first input of an OR gate and to a second input of said second AND gate;

an output of said third AND gate is connected to a second input of said OR gate;

an output of said OR gate is connected to a third input of said first AND gate;

an output of said AND gate is connected to an input of a second inverter;

an output of said second inverter is connected to said status wire and to a second input of said third AND gate;

wherein the output of said first AND gate is a high voltage when said test bit is at least as low as the lowest of said other bits, and the output of said first AND gate is a low voltage when there is at least one other bit that is lower than said test bit;

wherein said comparing means comprises said first and second inverters, said second and third AND gates, and said OR gate.

3. The system of claim 1 wherein each competing processor includes means for placing its logical address onto the bidirectional bus during said awarding process, thus the resolution members of the competing processors, working together, determine which competing processor has the lowest logical address.

4. A fully distributed computing system comprising:

several processors, each having an arbitrarily long unique logical address;

a bidirectional bus connected to each of said processors for communicating information between and among processors;

means for resolving requests from a competing set of said processors desiring access to the bus for subsequent communication with another processor, wherein said resolving means awards bus access to that competing processor having the lowest logical address;

said resolving means comprising control lines connected to all of the processors for defining an interface between the information communicating process and the awarding process, wherein all the control lines are bidirectional;

said resolving means further comprising a resolution member within each processor;

wherein each processor's resolution member comprises at least one dual-bit resolve element, said resolve element being a circuit for determining whether the value of two binary test bits representing two bit positions of the logical address of that processor is at least as low as the lowest bit-pair value in a set of other pairs of binary bits representing the same two binary bit positions of the logical address of each of the other competing processors, said circuit comprising:

two address wires for communicating the value of said two binary test bits;

three status wires conveying unitary bits representing all the possible unitary states of said other bit pairs, with said unitary bits connected to said three status wires in such a way that each status wire has a low voltage when at least one of said unitary bits connected to said wire is a unitary "zero", whereas each said status wire has a high voltage when all of the unitary bits connected to said wire are unitary "ones"; and connected to said address wires and to said status wires, means for comparing the contents of said address wires with said unitary bits.

5. The system of claim 4 wherein each of said circuits further comprises:

coupled to said address wires and to said comparing means, means for converting said two binary test bits into a four-state unitary representation.

6. The system of claim 5 wherein each of said converting means comprises a first inverter having an input connected to said first binary test bit;

a second inverter having an input connected to said second binary test bit;

a first AND gate having a first input connected to said first binary test bit, and a second input connected to said second binary test bit;

a second AND gate having a first input connected to said first binary test bit, and a second input connected to an output of said second inverter;

a third AND gate having a first input connected to an output of said first inverter, and a second input connected to said second binary test bit; and a fourth AND gate having a first input connected to an output of said second inverter, and a second input connected to an output of said first inverter.

7. The system of claim 6 wherein each of said circuits further comprises an enable wire which has a high voltage when said determining circuit is activated, said enable wire connected to inputs of each of said first through fourth AND gates;
   a delay element having a preselected time delay, and having an input connected to said enable wire and an output connected to a first input of a fifth AND gate;
   wherein said enable line is connected to a second input of said fifth AND gate.

8. The system of claim 7 wherein each of said comparing means comprises:
   an output of said first AND gate connected to an input of a sixth AND gate;
   an output of said second AND gate connected to an input of a first driver and to an input of a seventh AND gate;
   an output of said third AND gate connected to an input of a second driver and to an input of an eighth AND gate;
   an output of said fourth AND gate connected to an input of an OR gate and to an input of a third driver;
   an output of said first driver connected to an input of said sixth AND gate and to the first of said three unitary status wires;
   an output of said second driver connected to inputs of said sixth and seventh AND gates and to the second of said three unitary status wires;
   an output of said third driver connected to inputs of said sixth, seventh, and eighth AND gates and to the third of said three unitary status wires;
   outputs of said sixth, seventh, and eighth AND gates connected to inputs of said OR gate; and
   an output of said OR gate connected to a third input of said fifth AND gate;
   wherein the output of said fifth AND gate is a high voltage when the value of said two test bits is at least as low as the lowest value of said other bit pairs, and the output of said fifth AND gate is a low voltage when there is at least one other bit pair having a lower value than said pair of test bits.

9. The system of claim 4 wherein each competing processor includes means for placing its logical address onto the bidirectional bus during said awarding process, thus the resolution members of the competing processors, working together, determine which competing processor has the lowest logical address.

* * * * *